(12) United States Patent
Iwamoto et al.

(10) Patent No.: US 7,073,630 B2
(45) Date of Patent: Jul. 11, 2006

(54) FLUID INJECTION APPARATUS FOR FLUID DYNAMIC PRESSURE BEARING

(75) Inventors: Mitsuharu Iwamoto, Chiba (JP); Tetsuya Nagata, Chiba (JP)

(73) Assignee: Seiko Instruments Inc., Chiba (JP)

( * ) Notice: Subject to any disclaimer, the term of this patent is extended or adjusted under 35 U.S.C. 154(b) by 446 days.

(21) Appl. No.: 10/410,462

(22) Filed: Apr. 9, 2003

(65) Prior Publication Data

US 2004/0020721 A1    Feb. 5, 2004

(30) Foreign Application Priority Data

Apr. 18, 2002    (JP) .............................. 2002-116569

(51) Int. Cl.
*F16N 17/30*    (2006.01)

(52) U.S. Cl. ........................ 184/55.1; 184/64; 384/399

(58) Field of Classification Search ............... 184/55.1, 184/6.22, 6.23, 64; 384/107, 398, 399, 471
See application file for complete search history.

(56) References Cited

U.S. PATENT DOCUMENTS

| | | | | |
|---|---|---|---|---|
| 5,524,728 A | * | 6/1996 | Williams et al. | 184/29 |
| 5,575,355 A | * | 11/1996 | Williams et al. | 184/55.1 |
| 6,170,611 B1 | * | 1/2001 | Daly | 184/6.14 |

* cited by examiner

*Primary Examiner*—David Fenstermacher
(74) *Attorney, Agent, or Firm*—Adams & Wilks

(57) ABSTRACT

A fluid injection apparatus for a bearing includes a bearing support surface for supporting the bearing so that a seal space is defined between the support surface and the bearing, a fluid injection passage comprised of an oil tank, a first conduit connecting the oil tank to the seal space, and an injection valve provided in the conduit, a decompression passage comprised of an oil recovery tank, a second conduit connecting the oil recovery tank to the seal space, a vacuum pump connected to the seal space through the oil recovery tank, and a decompression valve provided in the second conduit, and a sequence control unit for evacuating the bearing by closing the injection valve, opening the decompression valve, and turning on the vacuum pump, and then filling the bearing with lubricating oil by turning off the vacuum pump, closing the decompression valve, and opening the injection valve.

7 Claims, 4 Drawing Sheets

FLUID INJECTION APPARATUS FOR FLUID DYNAMIC PRESSURE BEARING

BACKGROUND OF THE INVENTION

The present invention relates to an improvement in a fluid injection apparatus for a fluid dynamic pressure bearing, which injects a lubricating fluid to the fluid dynamic pressure bearing by using a vacuum injection method.

As shown in FIG. 4 for instance, the fluid dynamic pressure bearing comprises a flanged shaft 1 formed by pressure-inserting a ring member 3 that is a thrust member to a cylinder member 2, a stepped cylindrical sleeve 4 in which the flanged shaft 1 is rotatably fitted, and an annular lid member 5 functioning also as a thrust presser member. Fine gaps R1, R2, R3, R4 and R5 formed between these members constituting the bearing are filled with a lubricating oil F. A taperlike fine gap S formed between an upper outer peripheral face of the cylinder member 2 and an inner peripheral face of the annular lid member 5 is a capillary seal functioning so as to prevent the lubricating fluid F from leaking outside by utilizing a capillary tube phenomenon and surface tension. A radial dynamic pressure groove G1 such as a herringbone groove is formed in a lower outer peripheral face of the cylinder member 2, and a spiral thrust dynamic pressure generating groove G2 such as a herringbone groove is respectively formed in an upper face and a lower face of the ring member 3. The taper-like fine gap S is a solitary opening of a single bag-like fluid filling portion comprised of the fine gaps R1, R2, R3, R4 and R5 which are in communication with each other and becomes an injection port for injecting the lubricating oil F. Incidentally, an example of the thrust dynamic pressure generating groove G2 is shown in FIG. 5.

In short, the fluid dynamic pressure bearing is a dynamic pressure bearing which has bearing members including a shaft and a sleeve, and in which lubricating fluid is filled in the single bag-like fluid filling portion including a radial gap and a thrust gap that are formed between the bearing members, and the radial dynamic pressure generating groove is formed in the radial gap and a thrust dynamic pressure generating groove is formed in the thrust gap.

Since the fine gap of a small and thin fluid dynamic pressure bearing is several μm—several hundred μm, the lubricating fluid is injected into the fluid dynamic pressure bearing by a vacuum injection method. As a conventional apparatus using the vacuum injection method, there is a lubricating fluid injection apparatus disclosed in U.S. Pat. No. 5,862,841.

As shown in FIG. 3, this conventional apparatus is a fluid injection apparatus for a fluid dynamic pressure bearing, which comprises a bearing holding case 70 having an O-ring through which a predetermined face of a fluid dynamic pressure bearing 27 is seated on a bearing holding face, bearing fixing means 44 for mounting and fixing the fluid dynamic pressure bearing 27 to the bearing holding base 70, a vacuum pump 52 for decompressing an inside of the fluid dynamic pressure bearing 27 through a seal space formed by the predetermined face of the fluid dynamic pressure bearing 27, the bearing holding face and the O-ring, a reservoir 74 in which a lubricating fluid is stored, a fluid injection tube 90 for injecting the lubricating fluid into the inside of the fluid dynamic pressure bearing 27 through the seal space, and liquid level control means for controlling a liquid level of the lubricating fluid to a 1st level separating from a tip of the fluid injection tube 90 when decompressed and to a 2nd level at which the tip of the fluid injection tube 90 is dipped when injected.

The liquid level control means is one in which the reservoir 74 is attached to the bearing fixing means 44 through a bellows 80, an actuator 78 driven by an oil pressure or air pressure cylinder is attached to the bearing fixing means 44, and liquid level control is performed by means of moving the reservoir 74 up and down by the actuator 78 as shown with an arrow mark. That is, since the liquid level control means is one for controlling upper and lower positions of the reservoir in which the lubricating fluid is stored, it is a device having a comparatively complex structure. Moreover, as to the bellows 80, it is necessary to use a bellows which has a sufficient strength against deforming even if an internal pressure becomes 50 mTorr or lower, and which has a high durability against frequent expansion and contraction over an extended period. However, there has been a problem in that a bellows having such high durability is very expensive. Moreover, even a high durability bellows must be exchanged at a suitable frequency. Accordingly, in the conventional fluid injection apparatus, there is also a problem in that the cost of periodic maintenance and part replacement is high.

SUMMARY OF THE INVENTION

A problem to be solved by the invention is to greatly reduce the cost and frequency of maintenance by adopting liquid level control means that does not require expensive part replacement in the fluid injection apparatus for the fluid dynamic pressure bearing, which uses the vacuum injection method.

In order to solve the above problem, the present invention provides a fluid injection apparatus for a fluid dynamic pressure bearing, comprising a bearing holding base or support platform having a bearing holding face or surface accommodating an O-ring on which a predetermined face of the fluid dynamic pressure bearing is seated, a bearing fixing device for urging the fluid dynamic pressure bearing toward the bearing holding face, a vacuum pump for decompressing an inside of the fluid dynamic pressure bearing, an oil tank in which a lubricating oil injected into the inside of the fluid dynamic pressure bearing is stored, an oil recovery tank for recovering the lubricating oil not injected into the inside of the fluid dynamic pressure bearing, an injecting passage for connecting the oil tank and a seal space formed by the predetermined face of the fluid dynamic pressure bearing, the bearing holding face and the O-ring, a decompressing passage for connecting the seal space and the vacuum pump through the oil recovery tank, an injection side valve inserted through the injecting passage, and a decompression side valve inserted through the decompressing passage.

Each of the injection side valve and the decompression side valve comprises an automatic valve that is adapted such that its open/close state is controlled by a sequence control unit for controlling a start/stop state of the vacuum pump.

DETAILED DESCRIPTION OF THE PREFERRED EMBODIMENT

Figure 1:
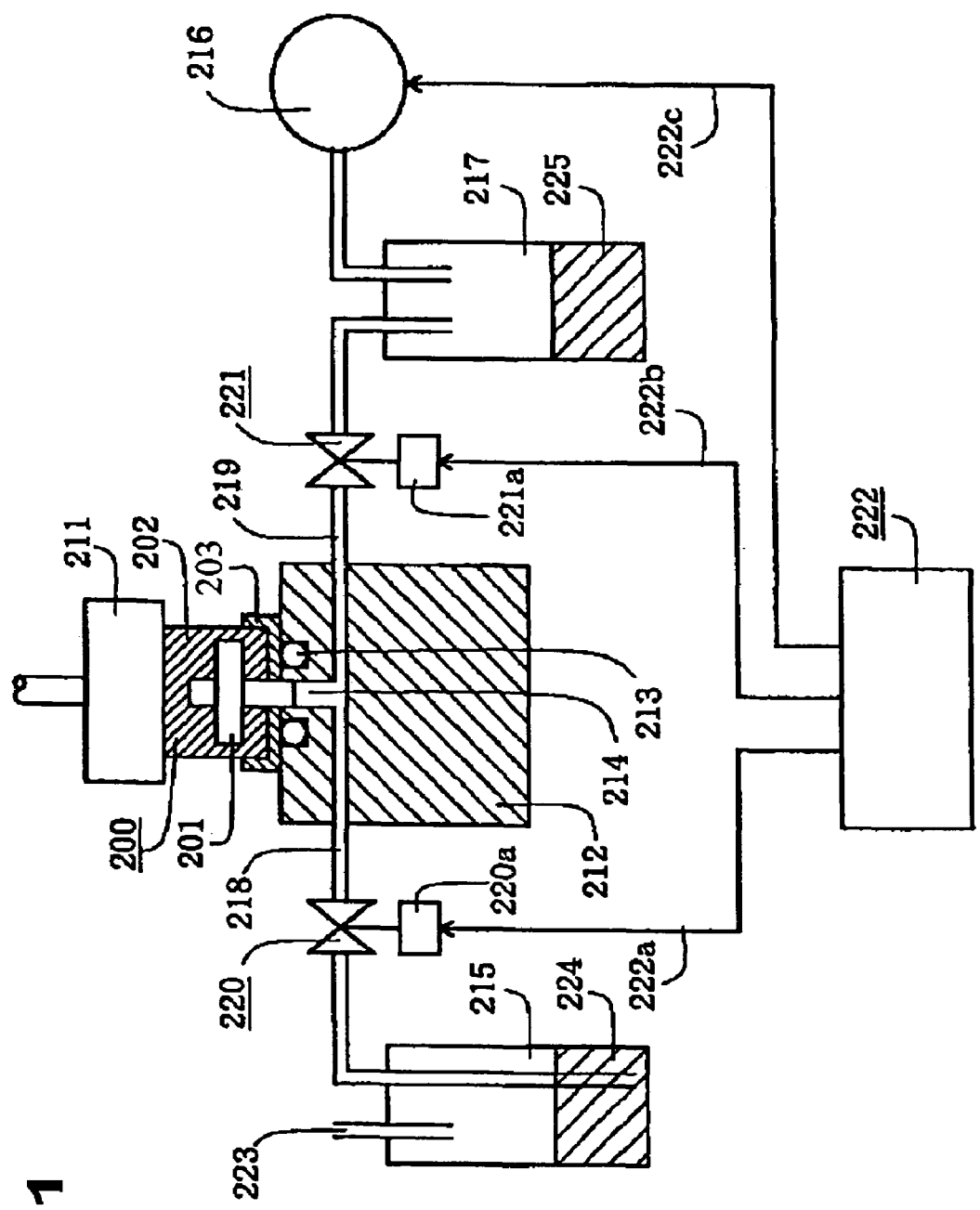
FIG. 1 is a structural view showing in section a main portion of a fluid injection apparatus in one embodiment of the present invention.
Figure 2:
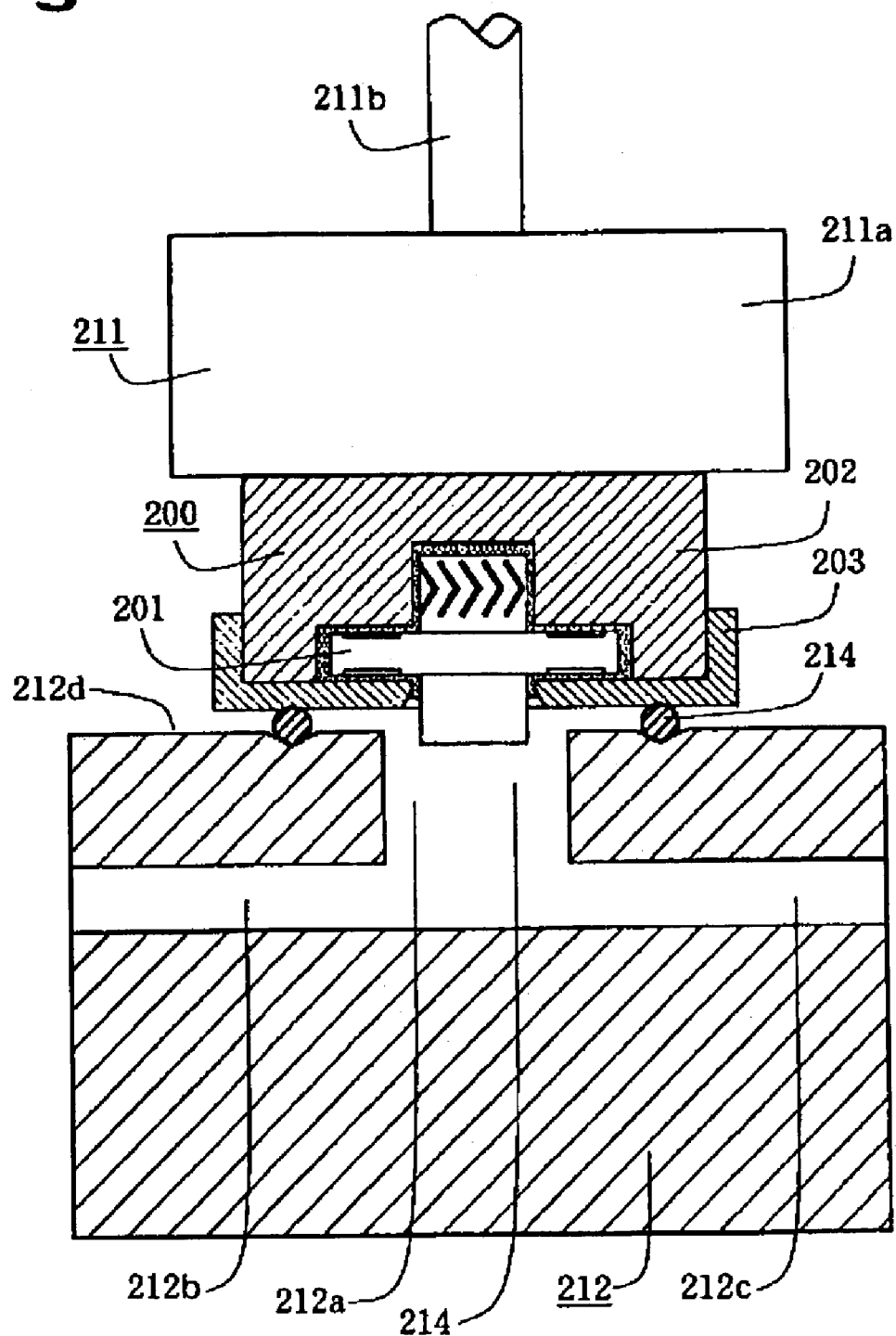
FIG. 2 is an enlarged sectional view of the main portion of the fluid injection apparatus in one embodiment, wherein a fluid dynamic pressure bearing is shown in a state in which fluid injection has been completed.
Figure 3:
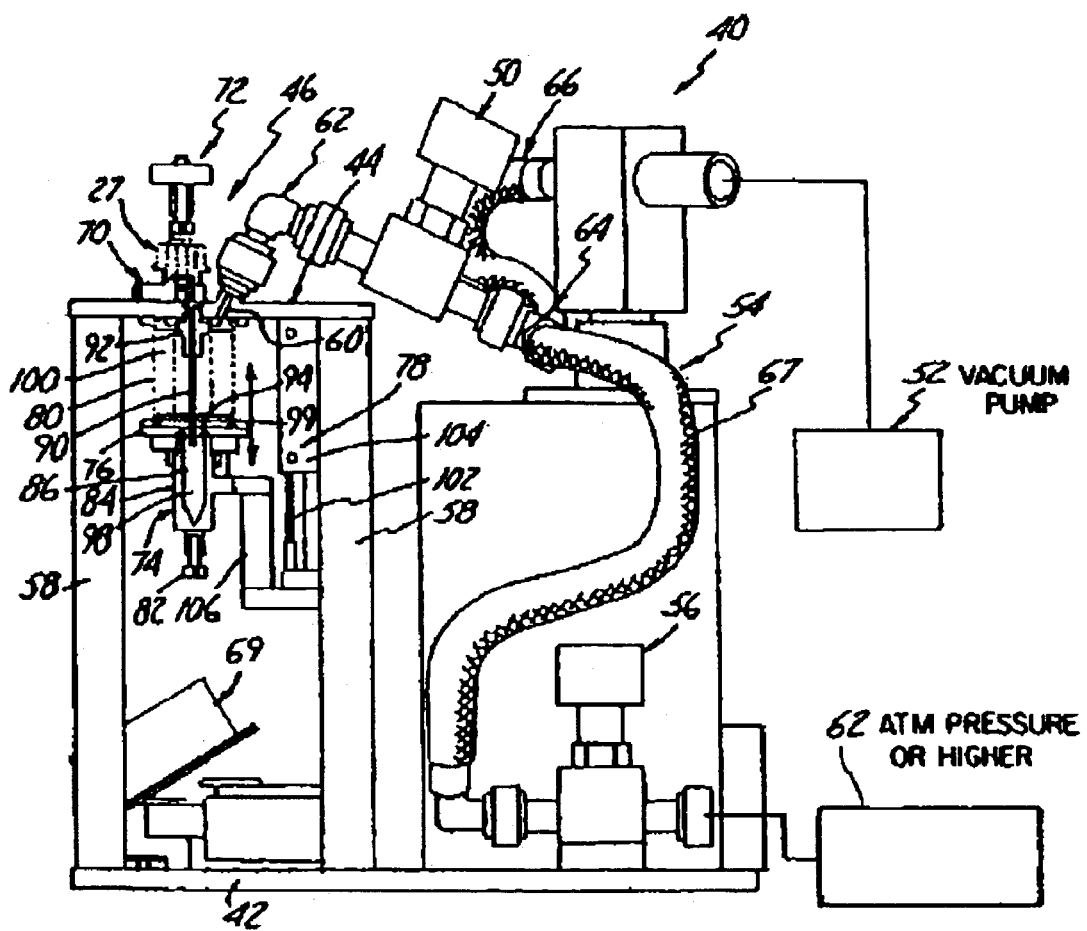
FIG. 3 is a structural view of a conventional fluid injection apparatus.
Figure 4:
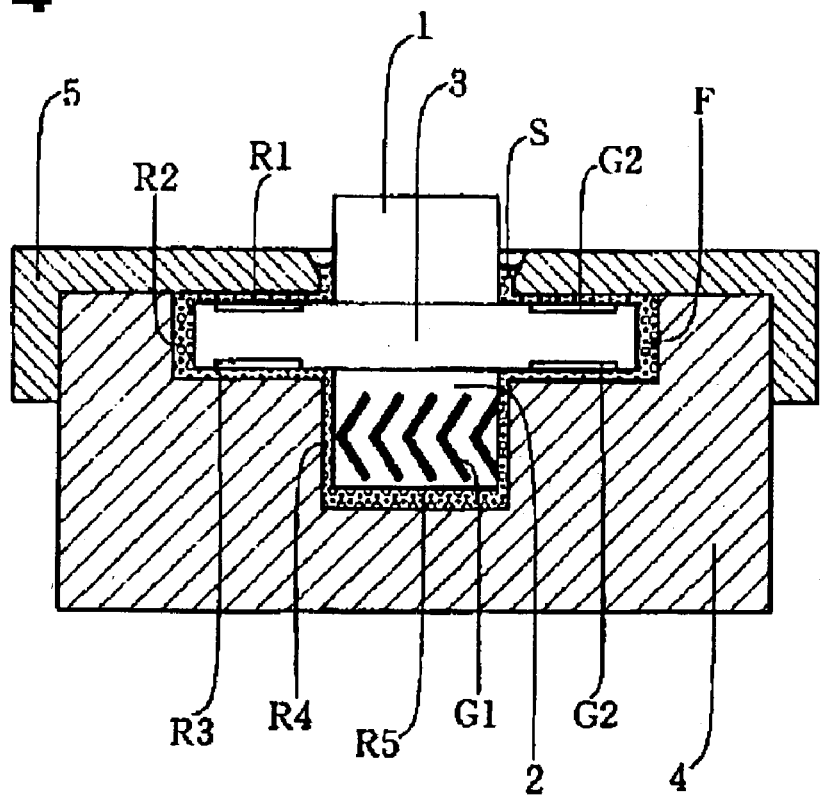
FIG. 4 is a sectional view of one embodiment of the fluid dynamic pressure bearing into which a lubricating fluid is injected, wherein a fine gap is shown exaggeratively.
Figure 5:
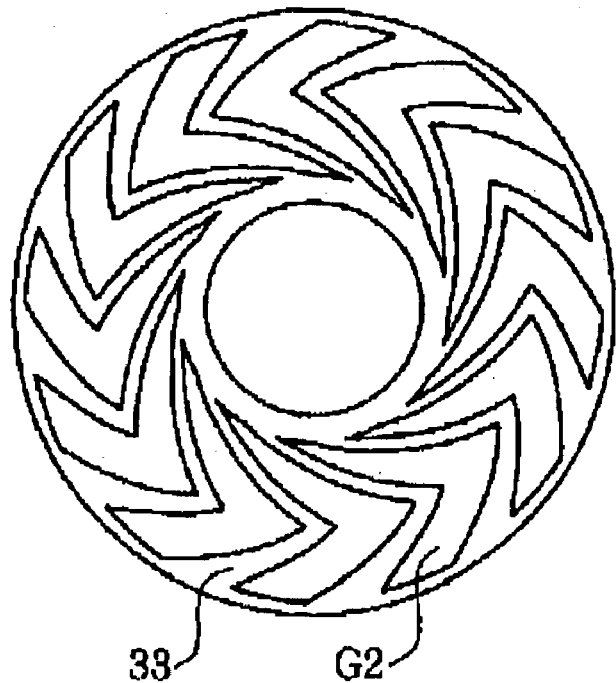
FIG. 5 is a view showing one example of a thrust dynamic pressure generating groove G2.

FIG. 1 is a structural view showing in section a main portion of one embodiment of the invention, which injects a lubricating fluid into a fluid dynamic pressure bearing 200 having a shaft 201, a sleeve 202 and a thrust presser plate 203, and FIG. 2 is a partial enlarged sectional view of the same.

In these drawings, a fluid injection apparatus for the fluid dynamic pressure bearing of one embodiment of the invention includes a support structure having a bearing holding base 212 having an O-ring 213 through which a predetermined face of the fluid dynamic pressure bearing 200 is seated, on a horizontal holding face, and a bearing fixing device 211 for mounting and fixing the fluid dynamic pressure bearing 200 to the bearing holding base 212.

In the bearing holding base 212, there are formed a cylindrical hole 212a coaxial with the O-ring 213, an injection side passage 212b communicating with the cylindrical hole 212a, and a decompression side passage 212c. The cylindrical hole 212a opens to a horizontal bearing holding face of the bearing holding base 212, and the injection side passage 212b and the decompression side passage 212b open to left and right side faces.

The bearing fixing device 211 includes a motor (not shown), a drive shaft 211b fixed to a rotation shaft of the motor, and a bearing presser member 211a attached to a tip of the drive shaft 211b.

In a fluid injection, a surface of the thrust presser plate 203 is seated to the O-ring 213 on the bearing holding base 212, and the fluid dynamic pressure bearing 200 is fixed to the bearing holding base 212 by means of applying a predetermined pressure by the bearing fixing device 211. Whereupon, a seal space 214 is formed between the fluid dynamic pressure bearing 200 and the bearing holding base 212. Referring to FIG. 2, the seal space 214 is a seal space formed by a surface of the thrust presser plate 203 of the fluid dynamic pressure bearing 200, the cylindrical hole 212a and a bearing holding face 212d of the bearing holding base 212, and the O-ring 213.

The fluid injection apparatus for the fluid dynamic pressure bearing of the presently described embodiment of the invention further includes a vacuum pump 216 for decompressing an inside of the fluid dynamic pressure bearing 200, an oil tank 215 in which a lubricating oil 224 injected into the inside of the fluid dynamic pressure bearing 200 is stored, and an oil recovery tank 217 for recovering the lubricating oil not injected into the inside of the fluid dynamic pressure bearing 200.

The oil tank 215 is connected to the seal space 214 through an injecting passage 218 and the injection side passage 212b, and opens to an atmosphere through an atmospheric pressure opening pipe 223. Further, the vacuum pump 216 is connected to the seal space 214 through the oil recovery tank 217, a decompressing passage 219 and the decompression side passage 212c.

The fluid injection apparatus for the fluid dynamic pressure bearing of the presently described embodiment of the invention additionally includes an injection side valve 220 inserted through the injecting passage 218, a decompression side valve 221 inserted through the decompressing passage 219, and a sequence control unit 222 for performing an open/close control of these valves and a start/stop control of the vacuum pump.

The fluid injection apparatus of the present embodiment generally performs the following operations in order, and thereby injects the lubricating fluid into the fluid dynamic pressure bearing.

First, the fluid dynamic pressure bearing 200 is seated on the O-ring 213 of the bearing holding base 212 with its capillary seal portion being made below.

Next, the motor of the bearing fixing device 211 is driven, and the fluid dynamic pressure bearing 200 is fixed to the bearing holding base 212 by the bearing presser member 211a.

Subsequently, the sequence control unit 222 generates an open/close signal 222a to thereby drive an operator 220a and close an injecting valve 220, and then generates an open/close signal 222b to thereby open a decompressing valve 221.

Subsequently, the sequence control unit 222 generates a start/stop signal 222c to thereby start the vacuum pump 216. Whereupon, the air filling the inside of the fluid dynamic pressure bearing 200, the seal space 214, the decompression side communicating hole 212c, the decompressing passage 219 and the oil recovery tank 217 is sucked to the vacuum pump 216, and thus the inside of the fluid dynamic pressure bearing 200 is decompressed. On this occasion, the lubricating oil remaining in the seal space 214, the decompression side communicating hole 212c and the decompressing passage 219 is recovered to the oil recovery tank 217 and stored as a recovery oil 225.

If the inside of the fluid dynamic pressure bearing 200 is decompressed, the sequence control unit 222 generates the open/close signal 222b to thereby drive the operator 221a and close the decompressing valve 221, and subsequently generates the start/stop signal 222c to thereby stop the vacuum pump 216.

Subsequently, the sequence control unit 222 generates the open/close signal 222a to thereby drive the operator 220a and open the injecting valve 220. Whereupon, the lubricating oil 224 stored in the injection tank 215 is pushed out by the atmospheric pressure, and injected into the inside of the fluid dynamic pressure bearing 200, which has been decompressed, through the injecting passage 218, the injection side communicating hole 212b and the seal space 214.

If the injection of the lubricating oil into the inside of the fluid dynamic pressure bearing 200 is completed, the motor of the bearing fixing device 211 is driven, the bearing presser member 211a is raised to an open position, and the fluid dynamic pressure bearing 200 is detached from the bearing holding base 212. By the above operations, the injection of the lubricating oil into one fluid dynamic pressure bearing is completed.

Incidentally, the start/stop of the motor of the bearing fixing device 211 is automatically controlled by the sequence control unit 222 together with the open/close of the injecting valve 220 and the decompressing valve 221 and the start/stop of the vacuum pump 216.

The invention is one which requires no liquid level control means in the fluid injection apparatus for the fluid dynamic pressure bearing, which uses the vacuum injection method. Accordingly, since expensive replacement parts, such as bellows, which are indispensible parts of the liquid level control means of the conventional fluid injection apparatus, are not required, the maintenance is easy, and the cost of the apparatus and its maintenance can be reduced.

What is claimed is:

1. In combination: a fluid dynamic pressure bearing having a stepped sleeve; a flanged shaft rotatably fitted into the stepped sleeve; and an annular lid covering one side of the stepped sleeve and serving as a thrust presser member; wherein fine gaps are formed between the flanged shaft, the stepped sleeve, and the annular lid, and lubricating oil is filled in the fine gaps; and a fluid injection apparatus for injecting lubricating oil into the fluid dynamic pressure bearing, the fluid injection apparatus comprising a bearing holding base having a bearing holding surface accommodating an O-ring for supporting the fluid dynamic pressure bearing; a bearing fixing device for urging the fluid dynamic pressure bearing toward the bearing holding surface so that a seal space is defined by the O-ring between the bearing holding surface and the fluid dynamic pressure bearing; a vacuum pump for evacuating an inside of the fluid dynamic pressure bearing through an opening in the fluid dynamic pressure bearing facing the bearing holding surface; an oil tank for storing lubricating oil that is to be injected into the opening in the fluid dynamic pressure bearing; an oil recovery tank for recovering lubricating oil that has not been injected into the fluid dynamic pressure bearing; an injection passage connecting the oil tank and the seal space; a decompression passage connecting the seal space and the vacuum pump through the oil recovery tank; an injection side valve provided in the injection passage; and a decompression side valve provided in the decompression passage.

2. A combination according to claim 1; wherein the flanged shaft comprises a cylindrical member and a ring member press-fitted thereto.

3. A combination according to claim 2; wherein a tapered fine gap is formed between an upper outer peripheral surface of the cylindrical member and an inner peripheral surface of the annular lid member, the fine gap serving as a capillary seal to prevent the lubricating oil from leaking from the opening.

4. A cominbation according to claim 2; wherein a radial dynamic pressure groove is formed in a lower outer peripheral surface of the cylindrical member.

5. A combination according to claim 4; wherein the radial dynamic pressure groove is a herringbone-shaped groove.

6. A combination according to claim 4; wherein spiral thrust dynamic pressure generating grooves are formed in upper and lower surfaces of the ring member.

7. A combination according to claim 6; wherein the thrust dynamic pressure generating grooves are herringbone-shaped grooves.

* * * * *